Oct. 15, 1940.    T. WATSON    2,218,060
STEP FOR MOTOR VEHICLES
Filed Sept. 9, 1939    2 Sheets-Sheet 1

Inventor
T. Watson
By Clarence A. O'Brien
and Hyman Berman
Attorneys

Oct. 15, 1940.　　　　T. WATSON　　　　2,218,060
STEP FOR MOTOR VEHICLES
Filed Sept. 9, 1939　　　　2 Sheets-Sheet 2
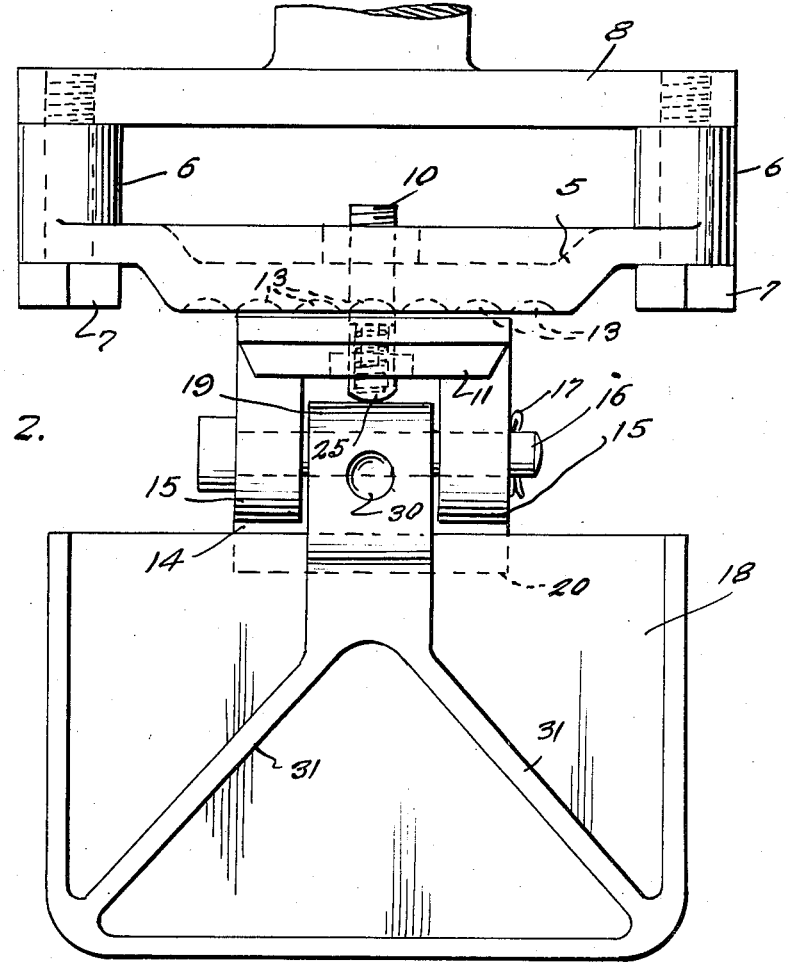
Inventor
T. Watson
By Clarence A. O'Brien
and Hyman Berman
Attorneys Patented Oct. 15, 1940

2,218,060

UNITED STATES PATENT OFFICE 2,218,060

STEP FOR MOTOR VEHICLES

Thomas Watson, Lyndhurst, N. J.

Application September 9, 1939, Serial No. 294,178

6 Claims. (Cl. 280—165)

This invention relates to steps for motor vehicles of the truck or bus types wherein it is frequently necessary for a person to step on a rear wheel hub to gain entrance to the truck or bus by a side door, and has for the primary object the provision of a device of this character which may be readily adapted to a wheel hub and which will provide a safe medium for a person to step on and eliminates the dangerous practice of using the wheel hub as a step and which may be readily brought into operative position and secured in said position until such time the wheel is rotated when it automatically assumes a folded or inoperative position so as not to strike an object passed by the truck or bus.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a motor vehicle wheel equipped with a step constructed in accordance with my invention.

Figure 2 is a top plan view showing the step in an operative position and attached to the hub the latter being only partly shown.

Figure 4 is a fragmentary side elevation showing the step in inoperative position.

Figure 1:
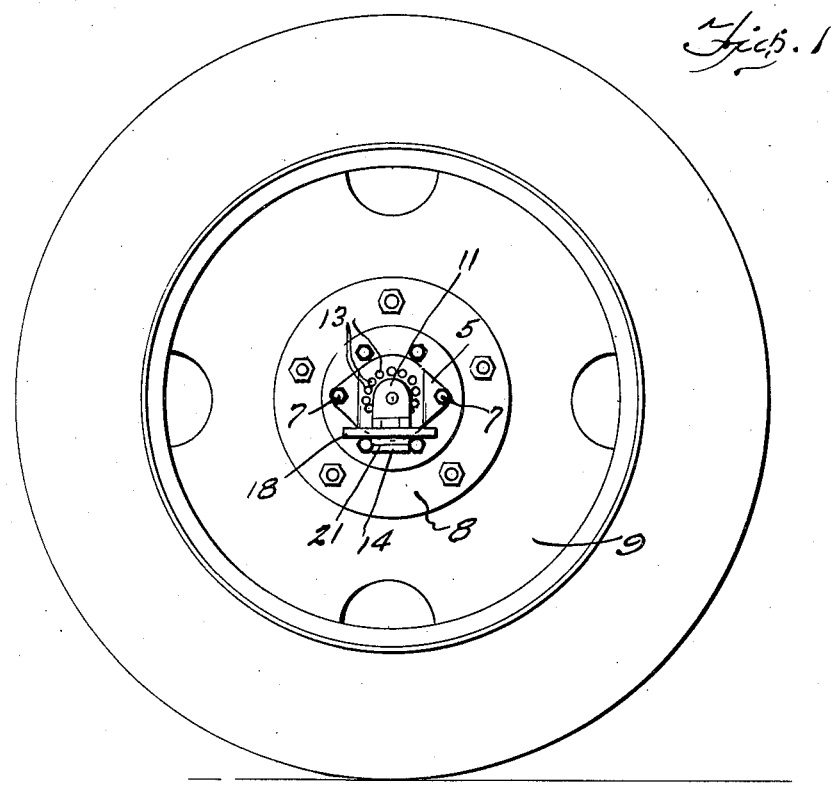

Referring in detail to the drawings, the numeral 5 indicates an attaching plate having formed upon one face thereof barrel-like portions 6 through which stud bolts 7 may extend for detachably securing the plate 5 on a hub 8 of a motor vehicle wheel 9. The stud bolts 7 form a part of the hub 8 in securing thereto the rear axle of the motor vehicle. The attaching plate 5 is centrally apertured to receive a bolt 10 for rotatably securing on the attaching plate 5 a step adjusting plate 11. The head of the bolt 10 is countersunk in the plate 11, as clearly shown in Figure 3, and said bolt is retained in position by a nut 12 threaded thereon and contacting the attaching plate 5.

The step adjusting plate 11 may be rotated relative to the attaching plate 5 and the latter has a series of sockets 13 formed therein and grouped in annular formation with the bolt 10 located centrally of the grouping of said sockets.

The plate 11 has integral therewith a shelf-like portion 14 on which are formed spaced apertured ears 15, the latter also being formed integrally with the front face of the plate 11. A pivot pin 16 extends through the apertured ears and is equipped with a cotter key or similar fastener 17 to permit the removal of the pivot pin 16 when desired.

A step plate 18 has formed upon one edge thereof an apertured ear 19 through which the pivot bolt 16 extends for pivotally connecting the step plate onto the step adjusting plate 11. The shelf 14 has a cut-away portion to form a seat 20 to be engaged by an offset 21 formed on the step plate 18 when the latter is arranged in an operative position for the purpose of relieving strain on the pivot pin 16 produced by the weight of a person standing on the step plate.

Figures 3, 5:
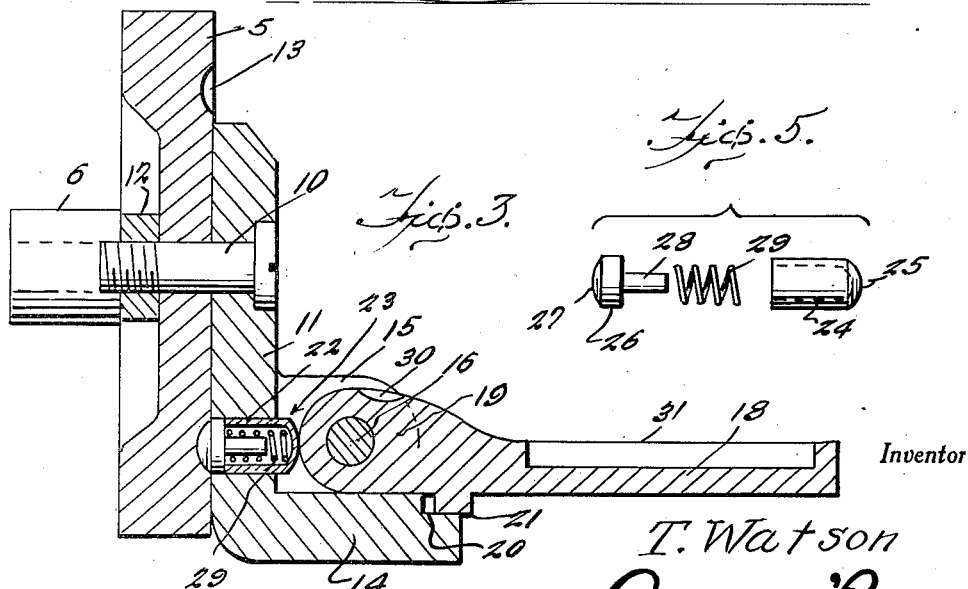
Figure 3 is a vertical sectional view showing the step in operative position.
Figure 5 is an exploded side elevation showing a spring influenced detent or plunger.

The step adjusting plate 11 is provided with an opening 22 in which is slidably mounted a spring influenced detent or securing member 23 consisting of a sleeve 24 having one end closed by a rounded wall 25 and a plunger member 26 provided with a rounded face 27 and a stem portion 28. A coil spring 29 fits over the stem portion 28 and bears against the plunger member 26 and the closed end wall of the sleeve 24. The opening 22 is located opposite the pivot pin 16 so that the detent or securing member 23 bears against the apertured ear 19 of the step plate and also against the attaching plate 5. The apertured ear 19 of the step plate is provided with a socket 30 in which the detent or securing member 23 may enter when the step plate is in an inoperative position, as shown in Figure 4, to retain the step plate in the latter-named position. When the detent or securing member 23 engages with the apertured ear 19 with the step plate 18 in an operative position, as shown in Figure 3, the detent or securing member 23 enters one of the sockets 13 of the attaching plate 5 and secures the step adjusting plate against rotation on the attaching plate.

It will be seen that the securing device 23 while free to slide within the opening 22 of the plate 11 will be prevented from moving entirely out of said opening by the apertured ear 19 of the step plate regardless of the position occupied by said step plate and also by the attaching plate.

Normally, the step plate will assume an inoperative position, as shown in Figure 4, either being moved into this position manually, or, if when in an operative position and during the rotation of the wheel, will gravitate into said inoperative position by the weight of the step plate when reaching an upside-down position during said rotation of the wheel. The step plate when in the inoperative position lies in close proximity to the hub of the wheel and consequently will not contact objects passed by the truck or bus.

The tread face of the step plate is preferably provided with ribs 31 acting to prevent a person's foot from slipping on said step plate and also as reinforcement to said step plate.

When it is desired to utilize the step plate, the step adjusting plate 11 is manually rotated until its shaft is disposed lowermost, the tension of the spring 29 being weakened sufficiently by the step plate being in inoperative position as to permit manual rotation of the plate 11 by the securing device riding into and out of the notches 13 of the attaching plate 5. The step plate is then swung downwardly to assume a horizontal position with the projection 21 resting on the seat 20. The step plate when in this position through its ear 19 places sufficient pressure on the spring 29 to increase its tension and thereby place the member 26 thereof into one of the sockets 13 of the attaching plate with sufficient force to maintain the step adjusting plate 11 against accidental rotation relative thereto. As before stated, as soon as the vehicle is placed in motion, due to the rotation of the wheel, the step plate will automatically assume an inoperative position.

It is believed that the foregoing description, when taken in connection with the drawings will fully set forth the construction and advantages of this invention to those skilled in the art to which such a device relates, so that further detailed description will not be required.

Having thus described my invention, what I claim is:

1. A step for motor vehicle wheels comprising an attaching plate secured on a hub of a wheel, a step adjusting plate journaled on said attaching plate, and a step plate hinged on said step adjusting plate.

2. A step for motor vehicle wheels comprising an attaching plate secured on a hub of a wheel, a step adjusting plate journaled on said attaching plate, and a step plate hinged on said step adjusting plate, and means for releasably securing the step plate against hinging movement and for releasably securing the step adjusting plate against rotation relative to the attaching plate.

3. A step for motor vehicle wheels comprising an attaching plate mountable on a hub of a wheel, a step adjusting plate journaled on said attaching plate and including a right-angularly disposed shelf, a step plate hinged on said step adjusting plate and when in one position adapted to rest on said shelf.

4. A step for motor vehicle wheels comprising an attaching plate mountable on a hub of a wheel, a step adjusting plate journaled on said attaching plate and including a right-angularly disposed shelf, a step plate hinged on said step adjusting plate and when in one position adapted to rest on said shelf, and means for releasably securing the step adjusting plate against rotation with respect to the attaching plate and for releasably securing the step plate against hinging movement.

5. A step for motor vehicle wheels comprising an attaching plate mountable on a hub of a wheel, a step adjusting plate journaled on said attaching plate and including a right-angularly disposed shelf, a step plate hinged on said step adjusting plate and when in one position adapted to rest on said shelf, said attaching plate having a series of sockets, and a spring influenced detent slidably supported by the step adjusting plate and engageable with the step plate for engagement with the sockets to releasably secure the step adjusting plate for rotation on the attaching plate.

6. A step for motor vehicle wheels comprising an attaching plate mountable on a hub of a wheel, a step adjusting plate journaled on said attaching plate and including a right-angularly disposed shelf, a step plate hinged on said step adjusting plate and when in one position adapted to rest on said shelf, said attaching plate having a series of sockets, a spring influenced detent slidably supported by the step adjusting plate and engageable with the step plate for engagement with the sockets to releasably secure the step adjusting plate for rotation on the attaching plate, said step plate including a socket to receive the spring influenced detent for releasably securing the step plate in a position of paralleling the step adjusting plate and at right angles to the shelf.

THOMAS WATSON.